United States Patent [19]

Ledford et al.

[11] 4,313,922

[45] Feb. 2, 1982

[54] REDUCING ASH CONTENT OF MOLTEN SULFUR

[75] Inventors: Thomas H. Ledford, Baton Rouge, La.; Raúl E. Pérez, Madison, N.J.

[73] Assignee: Exxon Research & Engineering Co., Florham Park, N.J.

[21] Appl. No.: 174,432

[22] Filed: Aug. 1, 1980

[51] Int. Cl.$^3$ .............................................. C01B 17/02
[52] U.S. Cl. .............................................. 423/578 R
[58] Field of Search .............. 423/567, 578; 23/293 S, 23/308 S

[56] References Cited

U.S. PATENT DOCUMENTS

| | | | |
|---|---|---|---|
| 1,990,602 | 2/1936 | Guernsey et al. | 23/308 S |
| 2,416,663 | 2/1947 | Menefee | 23/293 S |
| 2,767,060 | 10/1956 | Sloan | 23/293 S |
| 3,687,628 | 8/1972 | Nelen | 423/578 |

FOREIGN PATENT DOCUMENTS

| | | | |
|---|---|---|---|
| 51-17515 | 2/1976 | Japan | 423/567 |
| 350573 | 6/1931 | United Kingdom | 423/578 |

OTHER PUBLICATIONS

"Chem. Abst." vol. 52, 1958; 16999g.

Primary Examiner—G. O. Peters
Attorney, Agent, or Firm—Edward H. Mazer

[57] ABSTRACT

A method for reducing the concentration of ash-forming compounds in molten sulfur is disclosed. The subject invention is directed at the addition to the molten sulfur of an ash flotation agent selected from the class consisting of sulfur compounds in an oxidation state lower than maximum, phosphorous compounds, and ammonium amide, and amino compounds to cause at least a portion of the ash-forming compounds to float to the surface of the molten sulfur storage facility. The ash-forming compounds which collect at the surface of the molten sulfur facility may then be removed by conventional means.

12 Claims, 3 Drawing Figures

REDUCING ASH CONTENT OF MOLTEN SULFUR

BACKGROUND OF THE INVENTION

This invention relates to a process for reducing the concentration of ash-forming compounds present in molten sulfur. More specifically the invention relates to the separation and removal of ash-forming compounds from molten sulfur by the addition to the molten sulfur of one or more compounds described hereinafter that promote the agglomeration and flotation of at least a portion of the ash-forming compounds to the surface of the molten sulfur where they can be removed.

In many petroleum processing operations in which hydrogen sulfide is present in a gas stream, particularly in treating tail gas from the reaction of $H_2S$ and $SO_2$ to produce elemental sulfur, the remaining hydrogen sulfide is removed by passing the gas stream through a venturi/absorber section where the hydrogen sulfide is absorbed by an aqueous solution containing salts. The hydrogen sulfide is converted to elemental sulfur which is subsequently precipitated from the scrubbing solution for further treatment. This sulfur, which may contain from about 30 to more than 12,000 parts per million by weight (wppm) of salt impurities, may be sent to a separate sulfur retention facility or it may be blended with relatively large quantities of low ash sulfur. In either event it is desirable to reduce the concentration of ash-forming compounds in the sulfur, since these compounds may adversely affect subsequent processing of the sulfur. For example in the production of sulfuric acid from sulfur, the sulfur is first burned to $SO_3$ in a spray jet burner. Salts and other impurities in the sulfur may form ash that plugs the orifices of the burner nozzles. As used hereinafter the term "ash-forming compounds" is defined to mean any impurity in the molten sulfur which forms an ash-type residue when burned or strongly heated. Generally, the ash-forming compounds in the sulfur will be primarily inorganic salts from the absorption process which inadvertently become entrained in the sulfur, although other ash-forming compounds also may be present.

Another concern in the manufacture of elemental sulfur is the presence of $H_2S$ and compounds that decompose to $H_2S$ in the sulfur.

During the manufacture of elemental sulfur, particularly by the reaction of:

$$2H_2S + SO_2 \rightarrow 3S + H_2O \qquad (1)$$

small quantities of $H_2S$ and hydrogen polysulfides, typically 150–300 parts per million by weight (wppm), may remain in the molten sulfur. The hydrogen polysulfides decompose to hydrogen sulfide, which is slowly released by the sulfur during storage. This slow release of hydrogen sulfide is undesirable for several reasons. Since the threshhold odor limit of $H_2S$ in air is relatively low, approximately 0.1 parts per million by volume (vppm), this slow release may create nuisance odors. Moreover, $H_2S$ is highly toxic, flammable and may form explosive mixtures with air. Accordingly, the presence of $H_2S$ in molten sulfur is being limited in many locations by increasingly stringent regulations.

Several methods have been used to decrease the residual hydrogen sulfide and hydrogen polysulfides concentration in sulfur. One method has been merely to allow a "weathering off" process to take place before the sulfur is transported. But, this is a relatively slow process that requires large sulfur storage capacity.

Another method for increasing the rate of this "weathering off" process uses a circulatory spraying system. However, this requires the purchase and use of circulatory equipment and may not reduce the concentration of ash-forming compounds in the sulfur or the concentration of residual hydrogen sulfides and hydrogen polysulfides to sufficiently low levels.

Other methods have involved the addition of chemical compounds and sulfur dioxide to the molten sulfur to convert the hydrogen sulfide and hydrogen polysulfides to elemental sulfur while not reducing the concentration of ash-forming compounds in the molten sulfur. British Pat. No. 1,393,967 describes a method for reducing the amount of hydrogen polysulfides and hydrogen sulfide by in situ reaction to form elemental sulfur. Sulfur dioxide and an additive, which is an inorganic alkali metal compound, ammonia, an ammonium compound or a basic organic compound with at least one amino group, is injected into the liquid sulfur while the sulfur is flowing through a conduit. Table I of this patent indicates that large amounts of $H_2S$ remain in the molten sulfur when $SO_2$ is not added with the additives noted. U.S. Pat. No. 3,447,903 discloses the addition of certain classes of compounds with $SO_2$ to molten sulfur for a variety of purposes, including the removal of small quantities of hydrogen sulfide. Among the classes of compounds disclosed are:

(A) Ammonia and its organic derivatives having a $K_B$ greater than $10^{-10}$;

(B) Primary, secondary and tertiary alkyl, aryl and cyclic amines having a $K_B$ greater than $10^{-10}$;

(C) Quaternary basic nitrogen compounds that decompose between 20° and 160° C. to yield ammonia or its inorganic derivatives having a $K_B$ value greater than $10^{-10}$ and;

(D) Quaternary basic nitrogen compounds that on heating to temperatures between 20° and 160° C., decompose to yield an organic amine having a $K_B$ value greater than $10^{-10}$. However, this process requires the further addition of sulfur dioxide to react with the $H_2S$ in place and form sulfur rather than liberating the $H_2S$. Neither of these methods reduces the concentration of ash-forming compounds in the molten sulfur. Moreover, use of $SO_2$ to remove $H_2S$ from molten sulfur is not desirable for several reasons. Sulfur dioxide is difficult to store, since it is gaseous at ambient conditions. Thus, means must be provided for injecting the $SO_2$ directly into the molten sulfur and for adjusting the relative quantities of $SO_2$ and the other additive metered into the molten sulfur. In addition, $SO_2$ is toxic, a strong irritant to the eyes and mucous membranes and an air contaminant. Moreover, $SO_2$ is corrosive to the carbon steel surfaces of some sulfur handling facilities. These factors may complicate or restrict its use in commercial facilities.

U.S. Pat. No. 3,278,269 describes several classes of compounds that may be added to molten sulfur to improve the friability of solidified sulfur. The compounds disclosed include the following:

A. Liquid and solid primary, secondary and tertiary alkyl, aryl, and cyclic amines having a $K_B$ value greater than $10^{-10}$ in which the amino nitrogen is attached to a primary, secondary or aromatic hydrocarbon;

B. Quaternary nitrogen compounds that decompose between 20°–160° C. to yield ammonia; and C. Quaternary nitrogen compounds that, on heating to temperatures between 20° and 160° C., decompose to yield an organic amine having a $K_B$ value greater than $10^{-10}$ in which the carbon atom directly attached to the amino nitrogen is primary, secondary or aromatic.

U.S. Pat. No. 3,364,655 discloses that $H_2S$ can be removed from liquid sulfur by atomizing the sulfur, and that this process can be further improved by the addition of ammonia. No methods for removing ash-forming compounds are disclosed.

Similarly, in *Z. Anal. Chem.* 166 (1959) pages 274–283 Schmidt and Talsky describe a method to convert hydrogen polysulfides to hydrogen sulfide by the addition to the sulfur of sulfites or cyanides.

It is desirable to provide a reliable, relatively inexpensive process for reducing the concentration of ash-forming compounds in the molten sulfur.

It is also desirable to provide a process in which the ash and $H_2S$ content of the molten sulfur may be reduced simultaneously without greatly increasing the manufacturing costs of the sulfur.

It is also desirable to provide a process in which the concentration of ash-forming compounds in the sulfur may be reduced by the addition of agents which do not require complex metering or addition facilities.

SUMMARY OF THE INVENTION

The subject invention is directed at a method for reducing the concentration of ash-forming compounds in molten sulfur comprising:

A. adding to the molten sulfur an effective amount of an ash flotation agent selected from the class of compounds consisting of:
  I. sulfur compounds in an oxidation state lower than maximum;
  II. phosphorous compounds; and
  III. ammonium and amino compounds, to thereby cause at least a portion of the ash forming compounds present in the sulfur to rise to, and collect at the surface of the sulfur; and B. removing at least a portion of the ash-forming compounds that collect at the surface of the sulfur.

In one preferred method an aqueous solution of the ash flotation agent or a melt of the ash flotation agent is metered by gravity into the molten sulfur. In another method, an aqueous solution, or a melt of the ash flotation agent is pumped into the molten sulfur.

DETAILED DESCRIPTION OF THE INVENTION

Figure 1:
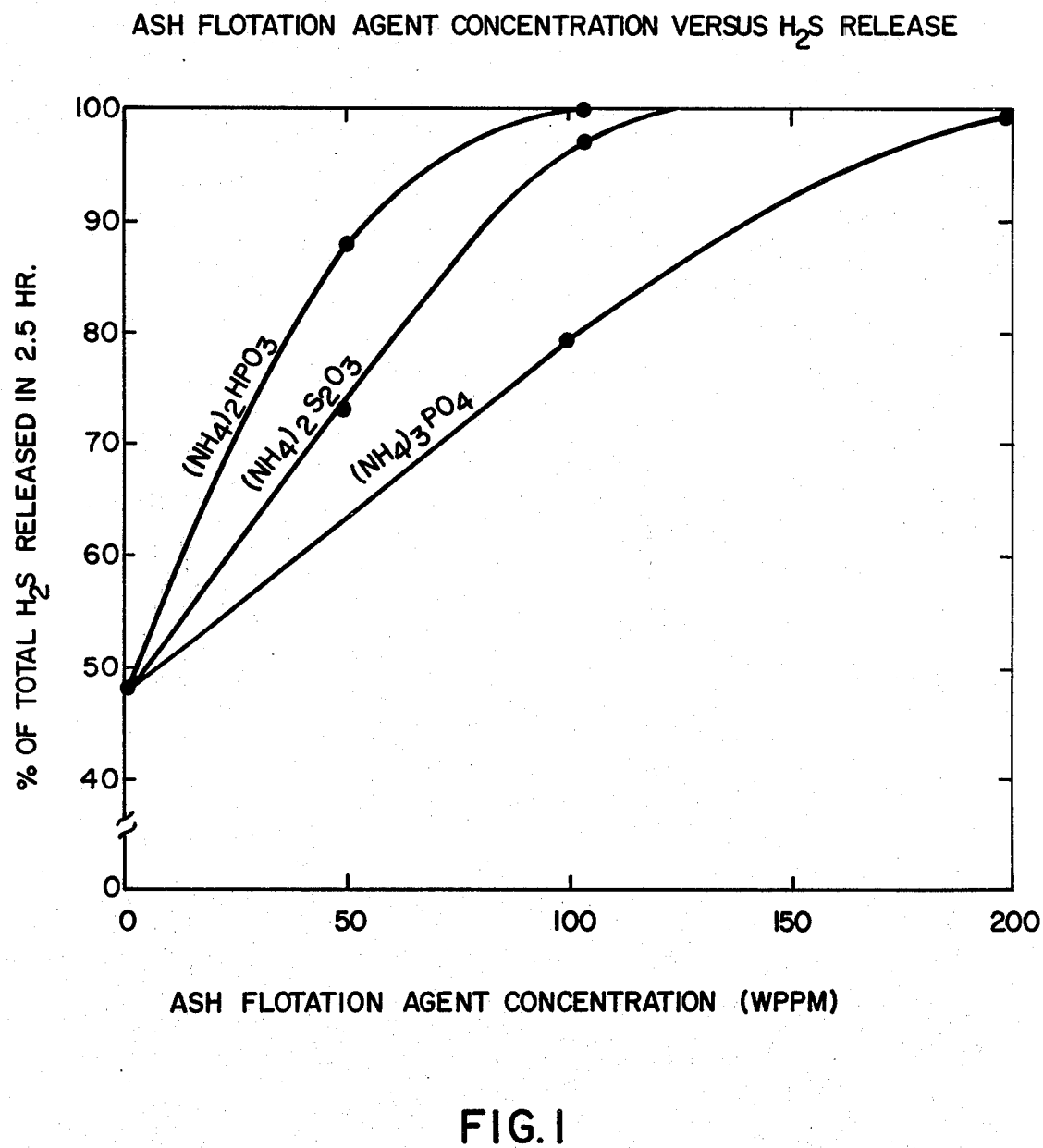
FIG. 1 is a plot of the percentage of the hydrogen sulfide and hydrogen polysulfides removed from samples during a 2.5 hour period as a function of the ash-flotation agent concentration for three ash-flotation agents.

Molten sulfur from conventional sulfur recovery sources, such as an absorption process using an aqueous salt solution, typically may contain as much as 50–500 parts per million by weight (wppm) of ash and as much as 700 wppm of $H_2S$ and hydrogen polysulfides. The ash flotation agents used should be effective at relatively low concentrations and be relatively easily volatilized from the sulfur so they do not themselves adversely affect the residual ash content of the sulfur. The compounds described hereinafter convert hydrogen polysulfides to hydrogen sulfide while promoting the flotation of at least a portion of the ash to the surface of the molten sulfur where it can be removed by conventional means. The ash flotation agents are selected from the class of compounds consisting of:

A. sulfur compounds in an oxidation state lower than maximum;

B. phosphorous compounds

C. ammonium, amide, and amino compounds.

Among the preferred compounds are the following:

A. dithionates, dithionites, thiosulfates, bisulfides, bisulfites, sulfides, sulfites with the more preferred compounds being easily volatilized salts such ammonium and alkyl ammonium salts, such as ammonium thiosulfate, ammonium bisulfite and ammonium sulfite;

B. phosphates, phosphines, phosphine oxides, phosphine sulfides, hypophosphates, phosphites with the more preferred being easily volatilized compounds such as ammonium, phosphonium, and alkyl ammonium salts, such as triammonium phosphates, diammonium hydrogen phosphate, and triphenylphosphine; and C. mono-, di-, tri- and tetra-ureas, thiourea, and cyclic urea with the more preferred being urea and thiourea.

Samples of candidate ash flotation agents first were screened for effectiveness in $H_2S$ degassing according to the following procedure. Samples of molten sulfur were taken from the combustor rundown line of a commercial sulfur plant so that sulfur having the highest $H_2S$ levels would be obtained for testing purposes. The samples, approximately 150 ml each, were poured from a sample dipper directly into spoutless 300 ml Berzelius beakers which also were used to contain the sulfur during analysis. The samples were kept hot during transport to the laboratory. A three-hole rubber stopper equipped with a thermometer and two unequal lengths of glass tubing was placed in the beaker opening. One piece of glass tubing extended below the surface of the sulfur while the other terminated above tha surface. Each compound screened was added to a stirred sulfur sample maintained at 130° C. Dry nitrogen was sparged through each sample for 2.5 hours with the released $H_2S$ and exiting nitrogen being directed through two gas adsorption bottles containing a 3% zinc acetate solution. After the sulfur was purged for 2.5 hours, the two gas absorption bottles were removed and replaced by two gas absorption bottles containing fresh 3% zinc acetate solution positioned as previously described.

Although lead sulfide is known in the art to be highly effective in promoting the decomposition of hydrogen polysulfides to $H_2S$, this compound is not used commercially to degas molten sulfur because of toxicity concerns from the presence of trace amounts of lead in the sulfur and because lead sulfide would increase the ash content of the sulfur. This known effectiveness of lead sulfide was used as a standard to determine the degassing characteristics of the compounds screened. One gram of lead sulfide was then added to the sulfur samples containing the ash flotation agents to decompose any hydrogen polysulfides which had not been removed by the ash flotation agent added during the first 2.5 hour period. Dry nitrogen was again sparged through the molten sulfur for a 2.5 hour period, the exiting nitrogen and $H_2S$ passing into the absorption train. The gas absorption bottles from the first and second 2.5 hour periods were poured into separate beakers for titration by a standard iodometric method. A known quantity of standardized iodine solution was added to each beaker and the unreacted iodine subsequently back-titrated with a standardized thiosulfate solution. This method is described in more detail in the *Analytical Chemistry of Sulfur and Its Compounds*, Edited by J. H. Karchmer, Part I, John Wiley & Sons, NY Pages 63–66 (1970), the disclosure of which is incorporated herein by reference. The effectiveness of each compound screened was determined by comparing the amount of $H_2S$ removed during the first 2.5 hour period with that removed during the second 2.5 hour period. The higher the ratio of the $H_2S$ removed during the first period relative to the second period, the more effective was the additive. Analytical results for various compounds tested are shown in Tables I, II and III at additive concentrations of 200, 100 and 50 WPPM respectively, in the molten sulfur. In Table I, all samples having the same test group number were drawn on the same day and have comparable initial $H_2S$ values.

TABLE I
TESTS AT 200 WPPM ADDITIVE LEVEL

| Test Group | Additive | First 2.5 hr. With Additive (ppm $H_2S$) | Second 2.5 hr. With PbS (ppm $H_2S$) | Total (ppm $H_2S$) |
|---|---|---|---|---|
| 1 | None | 246 | 282 | 528 |
| 1 | $H_2O$ (<1000 ppm) | 167 | 355 | 522 |
| 2 | $NH_4Cl$ | 218 | 272 | 490 |
| 2 | $NH_4HSO_4$ | 259 | 266 | 525 |
| 3 | $(NH_4)_2C_2O_4$ | 314 | 310 | 624 |
| 3 | $(NH_4)_2S_2O_3$ | 619 | 3 | 622 |
| 3 | $Na_2S_2O_4$ | 583 | 6 | 589 |
| 3 | $(C_6H_5)_3P$ | 625 | 32 | 657* |
| 4 | $NH_4SCN$ | 331 | 190 | 521 |
| 4 | $(NH_4)_3PO_4$ | 497 | 4 | 503 |
| 5 | $CO(NH_2)_2$ | 486 | 18 | 504 |
| 6 | $(NH_4)_2S_2O_8$ | 213 | 159 | 372 |
| 7 | $(NH_2)_2CS$ | 614 | 0 | 614 |
| 8 | $NH_4CO_2H$ | 335 | 498 | 833 |

*Some phosphine carried by the sparge gas into the solution causes an artificially large value because the analysis cannot distinguish between phosphines and $H_2S$.

TABLE II
TESTS AT 100 WPPM ADDITIVE LEVEL

| Additive | First 2.5 Hrs. With Additive | Second 2.5 Hrs. With PbS | Total $H_2S$ (WPPM) |
|---|---|---|---|
| $NH_4HSO_3$ | 289 | 153 | 442 |
| $(NH_4)_2SO_3$ | 421 | 25 | 446 |
| $(NH_4)_2S_2O_3$ | 428 | 2 | 430 |
| $(NH_4)_3PO_4$ | 374 | 93 | 467 |

TABLE III
TESTS AT 50 WPPM ADDITIVE LEVEL

| Additive | First 2.5 Hrs. With Additive | Second 2.5 Hrs. With PbS | Total $H_2S$ (WPPM) |
|---|---|---|---|
| $(NH_4)_2SO_3$ | 401 | 145 | 546 |
| $(NH_4)_2S_2O_3$ | 418 | 162 | 580 |
| $(NH_4)_2HPO_4$ | 496 | 74 | 570 |
| $(NH_4)_3PO_4$ | 272 | 310 | 582 |

The relative degassing ability of the compounds may be seen more clearly by their effectiveness at low concentrations in the sulfur. The relative effectiveness of three selected compounds in degassing sulfur at varying concentrations in the sulfur may be seen from FIG. 1, in which the ash flotation agent concentration is plotted against the percent of the total $H_2S$ released in the first 2.5 hours.

The data in Table I show that the ammonium ion in not the portion of the ammonium salt that was active in degassing the molten sulfur. For example, ammonium chloride and ammonium bisulfate were totally ineffective for degassing the molten sulfur. Even ammonium salts of weaker acids such as oxalic, formic and carbonic acids were much less effective than the best agents tested, ammonium thiosulfate, ammonium phosphate, and sodium dithionite.

The ability of the ash flotation agents to reduce the concentration of ash-forming compounds was then determined as follows. The ash content of a molten sulfur sample with no ash flotation agent present and with one ash flotation agent. Ammonium thiosulfate, was determined and is presented in Table IV. In these tests the ash determination involved merely burning a 100 gram sample of the sulfur in a pre-weighed crucible and weighing the ash remaining in the crucible after combustion and subsequent cooling in a desiccator.

The ability of ammonium thiosulfate to reduce the ash contents of samples both high and low in inorganic salt levels was determined in the presence of concrete and carbon steel. Samples of sulfur were kept at 130°–140° C. for 24 hours while small blocks of concrete and small samples of carbon steel were suspended in the sample to determine the corrosive effects of the sample on the typical materials of construction of a sulfur pit. Both the treated samples and untreated controls were sampled from their top strata and from near the bottom of their respective containers. The results of these tests are shown in Table IV.

TABLE IV
ASH TEST IN PRESENCE OF CONCRETE AND CARBON STEEL

| | Treated Sample (2,000 ppm $(NH_4)_2S_2O_3$) Ash Content (wppm) | Untreated Sample (No additive) Ash Content (wppm) |
|---|---|---|
| Low Salt Sulfur | | |
| Sample from top | 8.7 | 2.9 |
| Sample from bottom | 25.6 | — |
| High Salt Sulfur | | |
| Sample from top | 269 | 139 |
| Sample from bottom | 10,280 | 11,780 |

The ammonium thiosulfate caused no corrosion of metal or damage to concrete in these tests. The rate of corrosion of carbon steel actually decreased after the addition of ammonium thiosulfate.

It should be noted that the ash content of the treated samples is higher than the controls for the samples taken from the top. The effectiveness of the ammonium thiosulfate in causing ash forming compounds to float to the top may be seen from the sample having the high salt content. The sample from the top of the treated sample was higher in ash content than the control, while the sample from the bottom of the treated sample was lower in ash content than the control.

In laboratory tests it was found advantageous to have continuous stirring of the sulfur during the degassing process. In two hour tests, substantially similar to those previously described, a significantly greater amount of H₂S was degassed when the sample was stirred, than when no stirring was done, as shown in Table V.

TABLE V

| H₂S REMOVAL WPPM FROM SAMPLES | |
|---|---|
| No Stirring | Continuous Stirring |
| 265,296 | 408 |

Based upon these tests it was believed that continuous mixing was necessary for reducing the concentration of ash forming compounds and the hydrogen sulfide and hydrogen polysulfide concentrations to relatively low levels in commercial facilities. Surprisingly, however, in a commercial-sized installation the sulfur could be degassed and the concentration of ash forming compounds reduced merely by gravity feeding the ash flotation agent into the molten sulfur through the inspection box, or look box, in the inlet line to the sulfur pit. After addition of the ash flotation agent was started, the residual concentration of hydrogen sulfide and hydrogen polysulfides decreased with time to relatively low levels, while the ash containing compounds floated to the sulfur pit surface. Such a flotation agent addition system has several advantages over complex mixing, metering and/or recirculation systems. The simplicity of this system greatly decreases equipment purchase and operating costs, while providing a more reliable, trouble free addition system.

Figure 2:
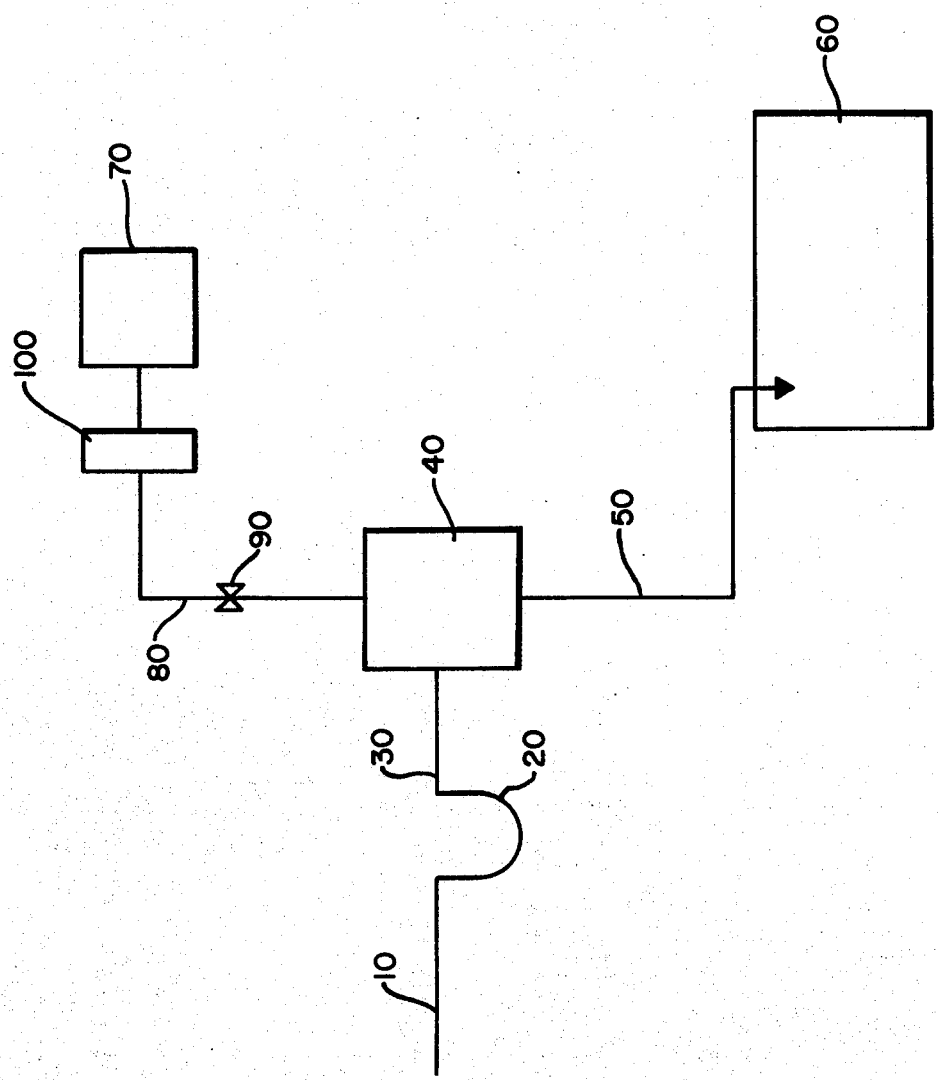
FIG. 2 is a simplified drawing of a molten sulfur facility together with means for adding an ash-flotation agent to the sulfur.

In FIG. 2 a preferred embodiment for the addition of the ash flotation agent to a conventional molten sulfur installation is shown. The installation comprises an inlet, inspection box, outlet and sulfur storage facility. In this figure, many lines, valves and all instrumentation have been omitted for simplicity. Molten sulfur leaving the sulfur recovery system passes through inlet 10 at a temperature in excess of 114° C., typically about 130° to about 165° C. The sulfur then passes through seal 20 and line 30 into inspection box 40. The molten sulfur, typically containing about 0 to about 650 wppm of hydrogen sulfide and hydrogen polysulfides and from about 0 to about 50 wppm of ash forming compounds, leaves inspection box 40 through line 50 for storage and cooling in a sulfur storage facility such as sulfur pit 60. A solution, preferably an aqueous solution, of at least one of the ash flotation agents is metered into inspection box 40 from storage tank 70 through line 80. Alternatively, if the melting point of the specific ash flotation agent utilized is below the temperature of the molten sulfur, the ash flotation agent may be added as a melt. To minimize the equipment required, storage tank 70 may be placed above inspection box 40, and the ash flotation agent gravity fed. The flow rate is controlled by metering valve 90. A filter 100 also may be added to minimize contamination of the molten sulfur and to prevent plugging of metering valve 90. The ash flotation agent solution or melt also may be metered into the molten sulfur installation using a conventional pump. The ash forming compounds which agglomerate at the surface of the sulfur may be removed by conventional solids removal means discussed in more detail hereinafter.

In one test, an ash flotation agent, ammonium thiosulfate, was added as an aqueous solution having 55 wt % ammonium thiosulfate to molten sulfur having a temperature ranging between about 125° and 150° C. The concentration of ammonium thiosulfate in the sulfur entering the sulfur pit without mechanical agitation was approximately 118 wppm. The average residence time of the sulfur in the pit was 70–80 hours. It was noted within the first few hours that a thick crust of inorganic salts formed on the sulfur surface. As indicated in Table VI the ash content of the sulfur, measured in a sample taken from the pit surface was 74–85 wppm before the addition of ammonium thiosulfate was started. After 70 hours from the start of the ammonium thiosulfate addition, the ash content of the sulfur samples taken from below the surface dropped to 47–55 wppm but the H₂S content of the sulfur was not significantly reduced.

To determine if the crust formed on the surface of the sulfur may have inhibited the volatilization of hydrogen sulfide from the sulfur pit, a test was done in a four-stage sulfur pit with mechanical sulfur recircuation using an aqueous solution having 55 wt % ammonium thiosulfate.

TABLE VI

EFFECT OF ADDING AMMONIUM THIOSULFATE IN A CONVENTIONAL SULFUR PIT ON THE H₂S CONCENTRATION OF SULFUR

| Time after Addition of (NH₄)₂S₂O₃ Started, Hrs. | H₂S Concentration in Sulfur; (wppm) | | Ash Content of Sulfur (wppm) | |
|---|---|---|---|---|
| | In Sulfur Pit | Exiting Sulfur | sulfur Pit | From Loading Truck |
| 0 (i.e. before addition started) | 219,220, 220,236 | — | 74,85 | — |
| 20 | 231,237 | 190,194 | — | 74,71 |
| 43 | 241,176 | 218,264 | — | 71,70 |
| 66 | 181,188 | — | — | — |
| 70 | 199,114 | 164,164 | — | 47,55 |
| 89 | 201,189,210 | — | — | — |
| 171 | 213,224 | — | — | — |

Stages 1,2 and 3 were equipped with sulfur recirculation pumps having 160, 130 and 150 GPM capacities, respectively, to recirculate the sulfur within the same stage.

These results are presented in Table VII and indicate that on a commercial scale ammonium thiosulfate effectively catalyzes the degasification of sulfur.

TABLE VII

EFFECT OF AMMONIUM THIOSULFATE ON THE PERFORMANCE OF SULFUR DEGASIFICATION FACILITY WITH CIRCULATION

| Set of Samples No. | Time After Addition of (NH₄)₂S₂O₃ in the Run Started, Hrs. | Ammonium Thiosulfate Addition Rate wppm | Residence Time of Sulfur in Each Stage, Hrs. | H₂S Concentration in Sulfur, wppm | | | |
|---|---|---|---|---|---|---|---|
| | | | | 1st Stage | 2nd Stage | 3rd Stage | 4th Stage |
| | | | | | | | (Inactive without recirculation pump) |

TABLE VII-continued
EFFECT OF AMMONIUM THIOSULFATE ON THE PERFORMANCE OF SULFUR DEGASIFICATION FACILITY WITH CIRCULATION

| Set of Samples No. | Time After Addition of (NH4)2S2O3 in the Run Started, Hrs. | Ammonium Thiosulfate Addition Rate wppm | Residence Time of Sulfur in Each Stage, Hrs. | H2S Concentration in Sulfur, wppm | | | |
|---|---|---|---|---|---|---|---|
| | | | | 1st Stage | 2nd Stage | 3rd Stage | 4th Stage |
| 1 | — | 0 | 1.2 | 259–263 | 228 | 204 | 185–194 |
| 2 | — | 0 | 1.6 | 339 | 339 | 328 | 315 |
| 3 | — | 0 | 1.6 | 275 | 211 | 168 | 170 |
| 4 | 5½ | 50 | 1.4 | 76 | 20 | 6 | 5 |

It should be noted that the hydrogen sulfide and hydrogen polysulfides concentration in Table VII decrease after the addition of ammonium thiosulfate when the sulfur was recirculated. The data of Tables VI and VII thus indicate that ammonium thiosulfate is effective as an ash flotation agent and also as a degassing agent. In a similar test on sulfur having a relatively high ash content of approximately 600 wppm, a crust of inorganic salts formed when aqueous solutions having 20–40 wt % urea were added to the molten sulfur to a concentration of approximately 40–160 wppm urea, thus indicating that urea is also an effective ash flotation agent. The combination of reducing the concentration of ash forming compounds in the sulfur and degassing the sulfur can be achieved by removing the ash forming compounds from the surface of the sulfur. This may be achieved by conventional liquid-solid separation means. Among the methods which appear to be particularly applicable are skimming the surface of the sulfur pit and passing at least the upper portion of the molten sulfur through a filtration means.

Figure 3:
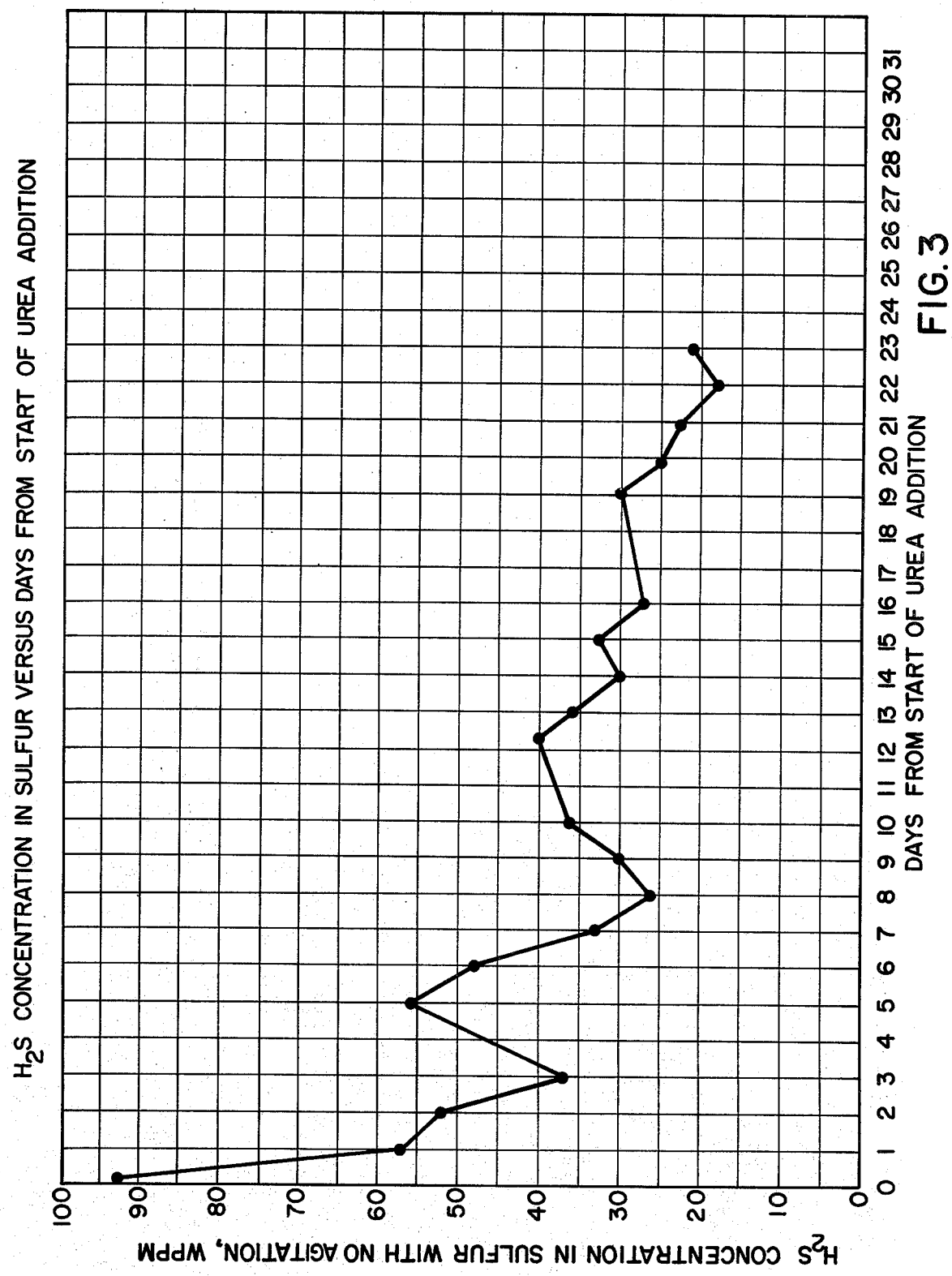
FIG. 3 is a plot of the residual $H_2S$ concentration in sulfur as a function of time after the commencement of the addition of a specific ash-flotation agent.

FIG. 3 is a plot of the residual $H_2S$ concentration in molten sulfur contained in a non-stirred sulfur pit where the sulfur to which about 100 wppm of urea was added using an aqueous solution containing 40 wt % urea. The sulfur had an average residence time ranging from about 3.5 to about 6 days. The residual concentration of $H_2S$ decreased significantly, illustrating that continuous use of urea also decreases the residual $H_2S$ concentration of the sulfur even in the absence of sulfur agitation. The ash content of the sulfur, both at the beginning and end of the test, was less than 5 wppm, thus further indicating that the urea addition did not adversely affect the ash content of the sulfur.

The concentration of the ash flotation agent utilized is not critical and will be dependent on the specific agent used. Generally, the rate of addition of the ash flotation agent to the molten sulfur will range between 1 (one) part per billion and 5000 parts per million, preferably from about 50 to 200 parts per million by weight.

While the invention has been described with respect to specific compounds and a specific embodiment, it will be understood that this disclosure is intended to cover any variations, uses, or adaptations of the invention including such departures from the present disclosure as come within known or customary practice in the art to which the invention pertains and as fall within the scope of the invention.

What is claimed is:

1. A method for reducing the concentration of ash-forming compounds in molten sulfur comprising the steps of:
   (a) adding an effective amount of an ash-flotation agent selected from the class consisting of:
      (i) dithionates, dithionites, bisulfides, bisulfites, and sulfites;
      (ii) phosphines, phosphine oxides, phosphine sulfides, and hypophosphates;
      (iii) ammonium compounds, mono, di- tri- and tetraureas, thiourea, and cyclic urea;
   to the molten sulfur to thereby cause at least a portion of the ash-forming compounds having a specific gravity less than that of the molten sulfur to float to and collect at the surface of the molten sulfur; and
   (b) removing at least a portion of the ash-forming compounds that collect at the surface of the molten sulfur.

2. The method of claim 1 wherein the ash-forming compounds are removed by skimming the surface of the molten sulfur.

3. The method of claim 1 wherein the ash-forming compounds are removed by filtration of the molten sulfur.

4. The method of claim 1 wherein the ash-flotation agent is selected from the class consisting of urea and ammonium thiosulfate.

5. The method of claim 1 wherein the concentration of the ash-flotation agent in the molten sulfur ranges between about one part per billion and about 5000 parts per million by weight.

6. The method of claim 4 wherein the ash-flotation agent is urea.

7. A method for reducing the concentration of ash-forming compounds in molten sulfur contained in an unagitated sulfur pit comprising the steps of:
   (a) adding an effective amount of an ash-flotation agent selected from the class consisting of:
      (i) sulfur compounds in an oxidation state lower than maximum;
      (ii) phosphorous compounds;
      (iii) ammonium, amide and amino compounds;
   to the molten sulfur to thereby cause at least a portion of the ash-forming compounds having a specific gravity less than that of the molten sulfur to float to and collect at the surface of the molten sulfur; and
   ((b) removing at least a portion of the ash-forming compounds that collect at the surface of the molten sulfur.

8. The method of claim 7 wherein the sulfur storage facility is a sulfur pit.

9. A method for removing ash-forming compounds present in molten sulfur in a sulfur installation of the type having an inlet, an inspection box communicating with the inlet, an outlet communicating with the inspection box, and a sulfur storage facility communicating with the outlet, the molten sulfur flowing from the inlet through the inspection box and outlet into the sulfur storage facility, the method comprising:
   (a) adding an effective amount of an ash-flotation agent to the inspection box, the ash-flotation agent disposed at an elevation above the inspection box, said ash-flotation agent added by gravity flow to the inspection box, the ash-flotation agent mixing with the sulfur to cause at least a portion of the ash-forming compounds having a specific gravity less than that of the molten sulfur to float to and collect at the surface of the sulfur storage facility; and (b) removing at least a portion of the ash-forming compounds having a specific gravity less than that of the molten sulfur that collect at the surface of the molten sulfur.

10. A method for reducing the concentration of ash-forming compounds in molten sulfur comprising the steps of:

(a) adding an effective amount of an ash-flotation agent selected from the class consisting essentially of:

(i) sulfur compounds in an oxidation state lower than maximum;
(ii) phosphorous compounds;
(iii) ammonium, amide and amino compounds;

to the molten sulfur to thereby cause at least a portion of the ash-forming compounds having specific gravity less than that of the molten sulfur to float to and collect at the surface of the molten sulfur; and (b) removing at least a portion of the ash-forming compounds that collect at the surface of the molten sulfur.

11. The method of claim 7 wherein the ash flotation agent is added as an aqueous solution.

12. The method of claim 7 wherein the ash flotation agent is added as a melt.

* * * * *